US010035212B2

(12) United States Patent
Madsen

(10) Patent No.: US 10,035,212 B2
(45) Date of Patent: Jul. 31, 2018

(54) METHOD AND APPARATUS FOR PROVIDING WELDING AND AUXILIARY POWER

(71) Applicant: Illinois Tool Works Inc., Glenview, IL (US)

(72) Inventor: Michael D. Madsen, Fremont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/785,289

(22) Filed: Oct. 16, 2017

(65) Prior Publication Data
US 2018/0050411 A1    Feb. 22, 2018

Related U.S. Application Data

(63) Continuation of application No. 14/636,315, filed on Mar. 3, 2015, now Pat. No. 9,808,881.

(51) Int. Cl.
| B23K 9/095 | (2006.01) |
| B23K 9/10 | (2006.01) |
| B23K 10/00 | (2006.01) |
| B23K 9/32 | (2006.01) |
| B23K 13/08 | (2006.01) |

(52) U.S. Cl.
CPC ............ B23K 9/1006 (2013.01); B23K 9/095 (2013.01); B23K 9/1043 (2013.01); B23K 9/32 (2013.01); B23K 10/006 (2013.01); B23K 13/08 (2013.01)

(58) Field of Classification Search
CPC ........ B23K 9/095; B23K 9/1006; B23K 9/32; B23K 9/1043; B23K 13/08; B23K 9/091; B23K 9/1012; B23K 9/1075; B23K 9/10

USPC .................................................... 219/130.21
See application file for complete search history.

(56) References Cited

U.S. PATENT DOCUMENTS

| 6,066,831 | A | 5/2000 | Ihara |
| 6,987,242 | B2 | 1/2006 | Geissler |
| 7,049,546 | B2 | 5/2006 | Thommes |
| 7,858,904 | B2 | 12/2010 | Fosbinder |
| 2009/0230941 | A1 | 9/2009 | Vogel |
| 2010/0194356 | A1 | 8/2010 | Fosbinder |
| 2014/0021180 | A1 | 1/2014 | Vogel |
| 2014/0263238 | A1 | 9/2014 | Ulrich et al. |
| 2015/0028013 | A1 | 1/2015 | Duval et al. |

FOREIGN PATENT DOCUMENTS

WO    2014/149782    9/2014

OTHER PUBLICATIONS

International Search Report, dated Jun. 6, 2016, European Patent Office, 2280 Rijiswijk Netherlands.

*Primary Examiner* — Brian Jennison
(74) *Attorney, Agent, or Firm* — George R. Corrigan

(57) ABSTRACT

A method and apparatus for providing welding-type power and auxiliary power includes an input circuit, a welding-type output power circuit, an auxiliary power circuit, and a controller. The input circuit receives input power and provides power to a common bus. The welding-type output power circuit receives power from the common bus and provides welding-type output power. The auxiliary power circuit receives power from the common bus and provides non-isolated auxiliary output power. The controller controls the auxiliary power circuit and the welding-type output power circuit.

19 Claims, 3 Drawing Sheets

US 10,035,212 B2

METHOD AND APPARATUS FOR PROVIDING WELDING AND AUXILIARY POWER

RELATED APPLICATION

This is a continuation of, and claims the benefit of the filing date of, U.S. patent application Ser. No. 14/636,315, filed on Mar. 3,2015.

FIELD OF THE INVENTION

The present disclosure relates generally to the art of welding type power supplies that include a welding type power circuit and an auxiliary power circuit.

BACKGROUND OF THE INVENTION

There are many known types of welding-type power supplies. Welding-type power, as used herein, refers to power suitable for electric arc welding, plasma cutting or induction heating. Welding-type systems are often used in a variety of applications and often include an auxiliary output to mimic utility power for powering tools, lights, etc. Welding-type system, as used herein, is a system that can provide welding type power, and can include control and power circuitry, wire feeders, and ancillary equipment. Utility power, as used herein, is power provided at a voltage and frequency by an electric utility.

Providing welding-type power, and designing systems to provide welding type power, provides for some unique challenges. For example, power supplies for most fields are dedicated to a single input and single output, or are rarely moved from one input to another. But, welding type systems will often be moved from one location to another, and be used with different inputs, such as single or three phase, or 115V, 230V, 460V, 575V, etc., or 50 hz or 60 hz signals, and be required to provide welding power and auxiliary power. Power supplies that are designed for a single input cannot provide a consistent output across different input voltages, and components in these power supplies that operate safely at a particular input level can be damaged when operating at an alternative input level. Also, power supplies for most fields are designed for relatively steady loads. Welding, on the other hand, is a very dynamic process and numerous variables affect output current and load, such as arc length, electrode type, shield type, air currents, dirt on the work piece, puddle size, weld orientation, operator technique, and lastly the type of welding process determined to be most suitable for the application. These variables constantly change, and lead to a constantly changing and unpredictable output current and voltage. Moreover, welding systems should provide auxiliary power at a constant and steady ac voltage, to properly mimic utility power. Finally, power supplies for many fields are designed for low-power outputs. Welding-type power supplies are high power and present many problems, such as switching losses, line losses, heat damage, inductive losses, and the creation of electromagnetic interference. Accordingly, welding-type power supply designers face many unique challenges.

Welding systems are often used in places where utility power is not available, and include an engine and generator to provide the power for conversion by the power circuitry. However, given the dynamic load of welding, it is challenging to match the power generated to the power consumed by the welding and auxiliary operations.

One prior art welding power supply that is well suited for portability and for receiving different input voltages is a multi-stage system with a preregulator to condition the input power and provide a stable bus, and an output circuit that converts or transforms the stable bus to a welding-type output. Examples of such welding-type systems are described in U.S. Pat. No. 7,049,546 (Thommes) and U.S. Pat. No. 6,987,242 (Geissler), and U.S. Patent Publication 20090230941 (Vogel), all three of which are owned by the owner of this invention, and hereby incorporate by reference. Miller® welders with the Autoline® feature include some of the features of this prior art.

FIG. 1 shows a prior art three-phase welding-type power supply consistent with U.S. Pat. Nos. 7,049,546 and 6,987,242 and U.S. Patent Publication 20090230941, and receives the three phase input Va, Vb and Vc on an input rectifier consisting of diodes 101-106. The rectified input is provided to a boost circuit 110, which boosts the input to a desired voltage (800V, e.g.) on a boosted or intermediate bus. Boost circuit 110 can include power factor correction, if desired. The boosted or intermediate bus is provided to a dc bus filter 112 (the bulk capacitance on the dc bus), and then to an isolated dc-dc converter 114. The dc-dc converter can include a converter (inverter, flyback, buck, etc), transformer and rectifier. The dc output is welding-type power. Such systems are significantly better than the prior art before them, and were the first welding-type systems to be "universal" in that they could accept nearly all available input power. They were also relatively portable and had improved power factors.

Prior art welding-type systems often provide auxiliary power outputs to power tools, etc. Auxiliary output power, as used herein includes, power provided to mimic utility power, such as 50/60 Hz, 120/240/200V, e.g., that can be used to power devices such as tools, lights, etc. U.S. Pat. No. 6,987,242 describes system where auxiliary power is derived using an inverter that creates a 575V signal that is stepped down by an isolation transformer to an aux power signal. While such a system is light weight and efficient compared to earlier systems, it includes an isolation transformer which increases weight and cost.

Accordingly, a welding-type system that maintains the advantages of prior art portable, universal input systems, but also avoids some of the deficiencies of the prior art is desired.

SUMMARY OF THE PRESENT INVENTION

According to a first aspect of the disclosure a welding-type power supply includes an input circuit, a welding-type output power circuit, an auxiliary power circuit, and a controller. The input circuit receives input power and provides power to a common bus. The welding-type output power circuit receives power from the common bus and provides welding-type output power. The auxiliary power circuit receives power from the common bus and provides non-isolated auxiliary output power. The controller controls the auxiliary power circuit and the welding-type output power circuit.

According to a second aspect of the disclosure a method of providing welding-type power includes receiving input power and providing intermediate power to a common bus. Then, deriving welding-type output power from the common bus and providing the welding-type power on a welding-type output. Also, deriving non-isolated auxiliary power from the common bus and providing non-isolated auxiliary output power on an auxiliary power output. The deriving of non-isolated auxiliary is controlled in response to an auxiliary demand for the non-isolated auxiliary power, and the deriving of welding-type output power is controlled in response to a welding demand for the welding-type output power.

The input circuit includes a rectifier and a preregulator in one alternative.

An engine provides motive power and a generator receives the motive power and provides the input power in another alternative.

The engine is a variable speed engine in one embodiment.

The generator is a variable frequency generator in one embodiment.

The controller controls the speed of the variable speed engine and/or the frequency of the variable frequency generator in various embodiments, preferably in response to at least one of a the demand for auxiliary power and the demand for the welding-type power.

The auxiliary power circuit provides a split-phase output in one embodiment.

Other principal features and advantages of will become apparent to those skilled in the art upon review of the following drawings, the detailed description and the appended claims.

Figure 1:
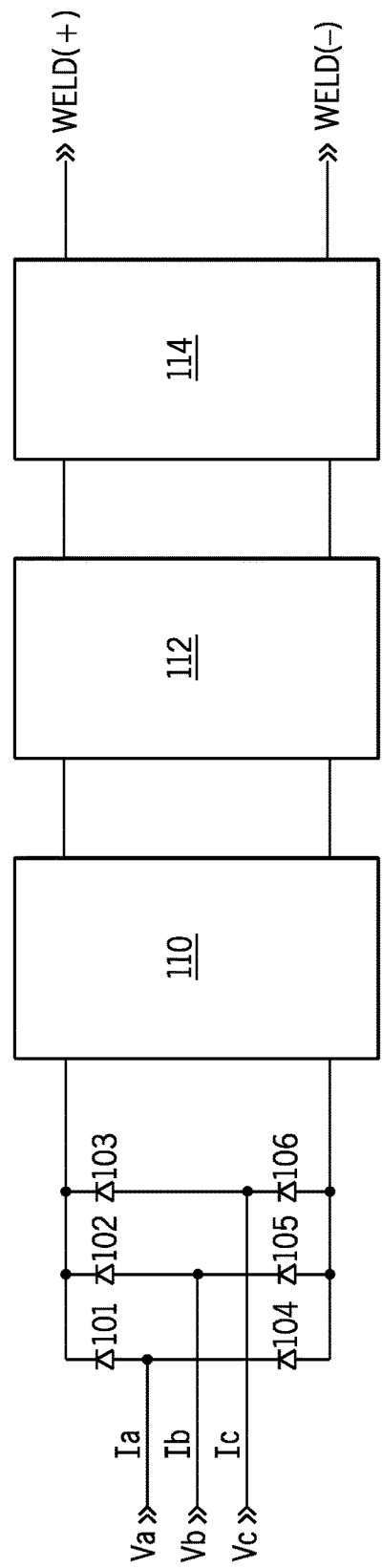
FIG. 1 is a prior art welding power circuit.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding type system having particular circuitry, it should be understood at the outset that the invention can also be implemented with other systems and other circuitry.

Generally the invention includes a welding-type power supply with an input circuit that provides power to a common bus, a welding-type output power circuit that receives power from the common bus and provides welding-type output power, an auxiliary power circuit that also receives power from the common bus and that provides non-isolated auxiliary output power, with a controller connected to control the auxiliary power circuit and the welding-type output power circuit. Welding-type power supply, as used herein, includes any device capable of supplying welding, plasma cutting, and/or induction heating power including resonant power supplies, quasi-resonant power supplies, etc., as well as control circuitry and other ancillary circuitry associated therewith.

Figure 2:
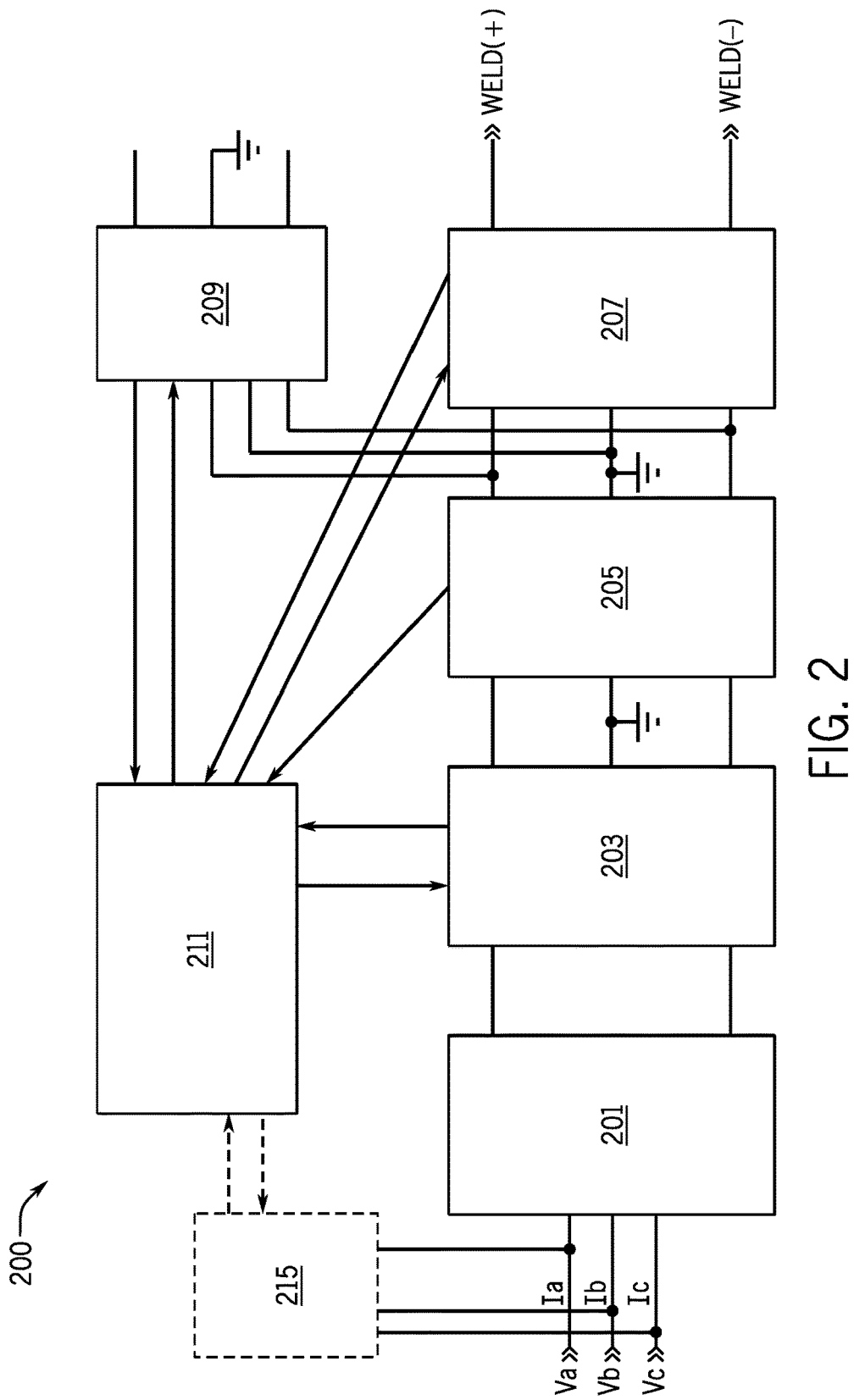
FIG. 2 is a block diagram of the preferred embodiment.

FIG. 2 shows a block diagram of a welding-type system 200 that implements the preferred embodiment. System 200 includes an input circuit 201 that receives input power. Input circuit 201 may be implemented using an input rectifier, such as that known in the prior art. The input power is preferably from a variable speed engine and a variable frequency generator, but can be utility or generator power, single or three phase, and any voltage within a wide range of voltages. Alternatives provide for receiving a dc input which input circuit 201 can filter and pass through. Input circuit, as used herein, includes circuits configured to receive an ac input signal and to provide a dc output signal and may include as part thereof a rectifier, a transformer, a saturable reactor, a converter, an inverter, a filter, and/or a magnetic amplifier.

System 200 also includes a preregulator 203 that receives the power signal from input circuit 201. Preregulator as used herein, includes circuitry such as rectifiers, switches, transformers, SCRs, etc. that process input power and/or software, control circuitry, feedback circuitry, communication circuitry, and other ancillary circuitry associated therewith. The preferred embodiment provides that preregulator 203 is a dual boost circuit preregulator. Dual boost circuit preregulator, as used herein includes, is a circuit that receives an input and provides two boosted outputs, one across a common and positive bus, and the other across the common and a negative bus. Common bus, as used herein includes, a bus that is used to power multiple outputs. Preregulator 203, can be implemented with a split boost circuit. Split boost circuit, as used herein includes, a boosting circuit with two switches (or groups of switches) that control charging of two unparalleled capacitors, and a fixed bus is provided across the two capacitors.

Preregulator 203 (which will be described in more detail below) receives the rectified power from input circuit 201 and boosts the signal to provides a boosted split bus. The preferred embodiment provides that preregulator 203 includes two boost inductors and two boost switches. Boost inductor, as used herein, is an inductor used in a circuit that boosts a voltage. Preregulator 203 also can provide power factor correction by proper timing of the boost switches. Alternatives provide for a single boost circuit, or other topologies such as buck converters, cuk converters, inverters etc.

Preregulator 203 is controlled by a controller 211. Controller 211 includes the logic circuitry or chip that determines when the boost switches in preregulator 203 are turned turn on and off to produce the desired output voltage and/or power factor correction. Controller, as used herein, includes digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator. Controller 211 receives feedback signals from preregulator 203, such as input current, out voltage, etc.

The output of preregulator is provided to a dc bus filter 205 (the bulk capacitance on the dc bus). Feedback from filter 205 is provided to controller 211 and can be used to insure that the bus is at its desired level, and to determine if the split bus is balanced.

The split, filtered dc bus is provided to an output converter 207 and to an auxiliary power circuit 209. Auxiliary power circuit, as used herein includes circuitry used to provide auxiliary output power.

Output converter 207 may be a single or multi-stage output circuit, and can include inverters, converters, transformers, etc. Output converter 207 is a welding-type power output circuit. Welding-type output power circuit, as used herein includes, the circuitry used to deliver welding-type power to the output studs. Converter 207 receives the split dc bus, and provides a welding-type output. Preferably converter 207 is controlled in response to the demand for welding power. Welding type output power, as used herein, refers to output power suitable for welding, plasma cutting or induction heating.

The preferred embodiment provides that converter 207 be implemented using a pulse width modulated inverter, a transformer and a rectifier, to provide the desired output waveform and to provide isolation between the welding output and the input. Such a converter output is described in detail in the prior art discussed above. Other topologies may be used if desired. For example, a chopper or buck converter is often used as an output circuit in welding-type power supplies. Also, a second inverter can be used to provide an ac output. Converter 207 provides feedback signals to and receives control signals from controller 211.

Figure 3:
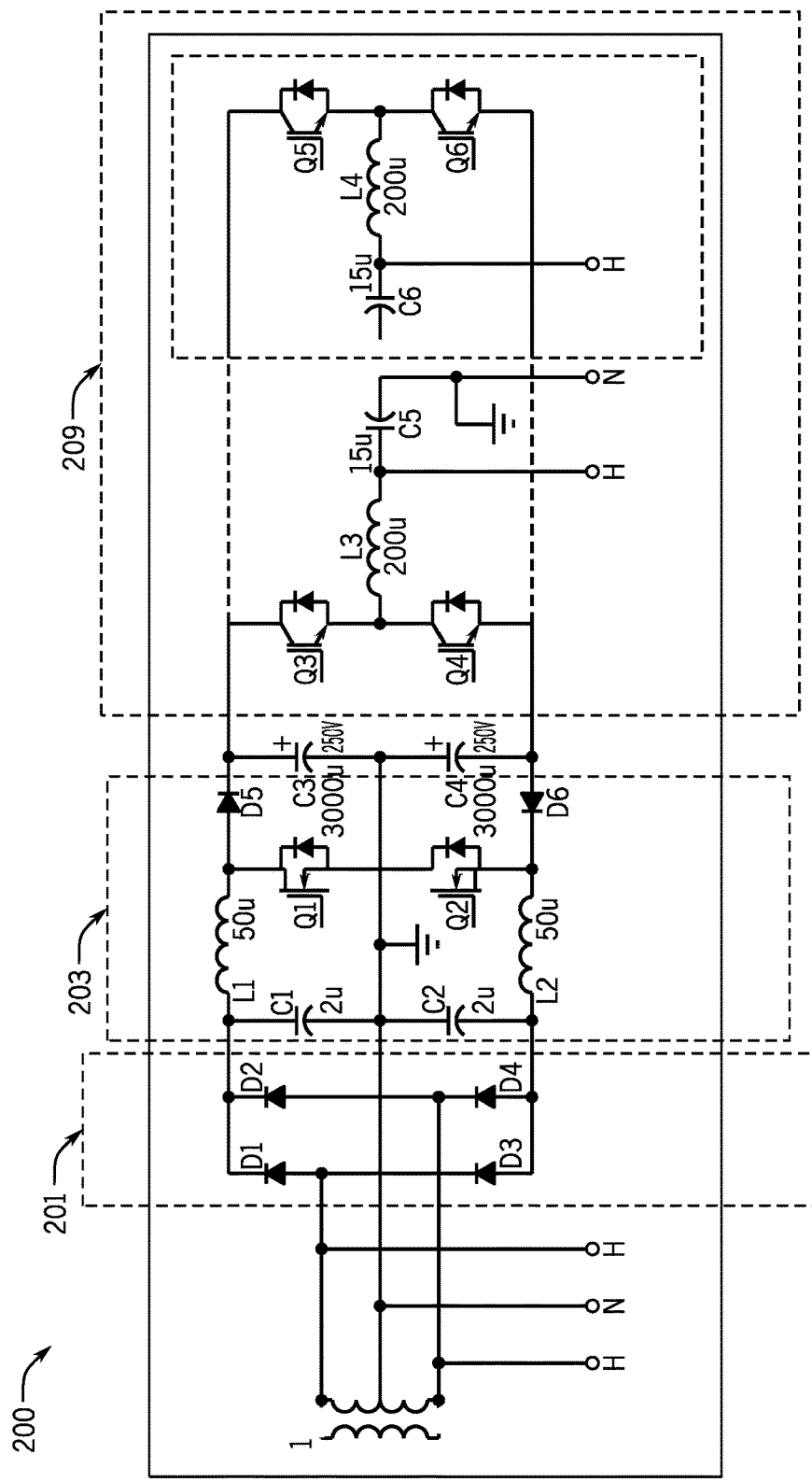
FIG. 3 is a circuit diagram of portions of the preferred embodiment.

Auxiliary power circuit 209 is implemented in the preferred embodiment using two half-bridge inverters without an isolation transformer. Each inverter provides a 115V AC 60 Hz output, and together they provide a split phase AC output such as that provided by utility power. The ac aux outputs create a 230V AC aux power output across the two non-common outputs. Thus, the preferred embodiment provides that split phase ac aux power is provided, to more closely mimic utility power, and to provide both 115 and 230V AC aux power, and to do so without using an isolation transformer. Other embodiments provide for other outputs, such as 200/400V, 230/460V, or 50 Hz. Alternatives include providing non-split phase auxiliary power without an isolation transformer FIG. 3 is a circuit diagram showing more detail for portions of welding-type system 200, including input circuit 201, preregulator 203, dc bus filter 205, and auxiliary power circuit 209. Welding type system 200 receives as an input single phase power. Alternatives provide for a three phase input, and one skilled in the art can configure system 200 to receive three phase power. The power may be from a utility source, or from an engine/generator 215 (shown in FIG. 2). Preferably generator 215 provides 10 KW of power at 3600 RPM. A 230V AC signal may be provided from generator 215 on the H, N, and H connections on FIG. 3. Engine/generator 215 preferably includes a variable speed engine, and the speed is preferably controlled by controller 215 in response to the power demand of system 200. Specifically, the speed is controlled in response to the demand for auxiliary power and/or the demand for welding power. Engine/generator 215 may be a variable frequency generator, and the frequency is controlled by controller 215. Alternatives provide for a controller that is part of and unique to engine/generator 215, and/or a multi-speed or single speed engine and a constant frequency generator and/or variable voltage generator.

The input is rectified by input circuit 201, which includes diodes D1-D4, in the preferred embodiment. The rectified DC signal from input circuit 201 is provided to filter capacitors C1 and C2 (preferably 2 µF), and then to preregulator 203. Capacitors C1 and C2 prevent ripple from being injected into the input. Preregulator 203 is a dual split boost and includes boost inductors L1 and L2 (preferably 50 µH) and switches Q1 and Q2. Switches Q and Q2 are controlled by controller 211 to provide a desired bus voltage and, preferably, power factor correction.

The output of preregulator 203 is provided through diodes D5 and D6 across bus capacitors C3 and C4 (preferably 3000 µF and rated for 250V). The common node of capacitors C4 and C5 is neutral, thus the output is a split bus. The bus is provided to the welding output converter 207 (FIG. 2) and to auxiliary power circuit 209.

Auxiliary power circuit 209 is comprised of, in the preferred embodiment, two 20 KHz half bridge inverters. Each inverter is comprised of two switches (Q3, Q4 and Q5, Q6, preferably IGBTs or FETs), an inductor (L3 and L4, preferably 200 µH), and a capacitor C5, C6 (preferably 15 µF). Each inverters output is provide across a unique hot output and a common neutral output. The inverters are pulse width modulated by controller 211 to provide a 115V AC sinusoidal output, and are 180 degrees out of phase from one another to provide a split phase auxiliary power output. Thus, the output of each inverter mimics a 115V utility signal, and combined they mimic a 230V AC utility signal. The output is a non-isolated auxiliary output. The inverters are preferably controlled in response to the demand for auxiliary power.

Alternatives provide for using other topologies (full bridge, etc.), and for providing only a single auxiliary power circuit, without split phase power, or for independently or not independently regulating the inverters.

Numerous modifications may be made to the present disclosure which still fall within the intended scope hereof. Thus, it should be apparent that there has been provided a method and apparatus for providing welding power and non-isolated auxiliary power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding-type power supply, comprising:
   a first circuit, disposed to receive at least one of ac and dc input power and provide bus power to a common bus;
   a welding-type output power circuit disposed to receive power from the common bus and provide power to a welding-type output;
   an auxiliary power circuit, disposed to receive power from the common bus and to provide non-isolated auxiliary output power; and
   a controller connected to control the auxiliary power circuit and the welding-type output power circuit.

2. The welding-type power supply of claim 1, wherein the first circuit includes at least one of a filter, a rectifier and a preregulator.

3. The welding-type power supply of claim 1, further comprising an engine that provides motive power, and a generator that receives the motive power and provides the input power.

4. The welding-type power supply of claim 3, wherein the engine is a variable speed engine.

5. The welding-type power supply of claim 4, wherein the controller is connected to control the speed of the variable speed engine.

6. The welding-type power supply of claim 5, wherein the generator is a variable frequency generator.

7. The welding-type power supply of claim 6, wherein the controller is connected to control the frequency of the variable frequency generator.

8. The welding-type power supply of claim 1, wherein the auxiliary power circuit provides a split-phase output.

9. A method of providing welding-type power, comprising:
- receiving at least one of ac and dc input power;
- providing intermediate power to a common bus;
- deriving welding-type output power from the common bus;
- providing the welding-type power on a welding-type output;
- deriving non-isolated auxiliary power from the common bus;
- providing non-isolated auxiliary output power on an auxiliary power output;
- controlling the deriving of non-isolated auxiliary power in response to an auxiliary demand for the non-isolated auxiliary power; and
- controlling the deriving of welding-type output power in response to a welding demand for the welding-type output power.

10. The method of claim 9, wherein providing intermediate power includes at least one of filtering, rectifying and preregulating the input power.

11. The method of claim 10, further comprising providing motive power to a generator and generating the input power with the generator.

12. The method of claim 11, wherein providing motive power includes controlling the speed of a variable speed engine in response to at least one of a the demand for the non-isolated auxiliary power and the demand for the welding-type power.

13. The method of claim 12, wherein generating the input power includes generating the input power at a variable frequency in response to at least one of a the demand for the non-isolated auxiliary power and the demand for the welding-type power.

14. The method of claim 13, wherein providing the non-isolated auxiliary output power includes providing a split-phase output.

15. A system of providing welding-type power, comprising:
- means for receiving at least one of ac and dc input power;
- means for providing intermediate power to a common bus, connected to receive the input power;
- means for deriving welding-type output power from the common bus, connected to the common bus;
- means for providing the welding-type power on a welding-type output, connected to the means for deriving welding-type;
- means for deriving non-isolated auxiliary power from the common bus, connected to the common bus;
- means for providing the non-isolated auxiliary output power on an auxiliary power output, connected to the means for deriving non-isolated auxiliary power;
- controlling the deriving of non-isolated auxiliary power in response to an auxiliary demand for the non-isolated auxiliary power; and
- controlling the deriving of welding-type output power in response to a welding demand for the welding-type output power.

16. The system of claim 15, wherein providing intermediate power includes rectifying and preregulating the input power.

17. The system of claim 15, further comprising providing motive power to a generator and generating the input power with the generator.

18. The system of claim 15, wherein providing motive power includes controlling the speed of a variable speed engine in response to at least one of the auxiliary demand for the non-isolated auxiliary power and the welding demand for the welding-type power.

19. The system of claim 15, wherein the means for providing the non-isolated auxiliary output power provides a split-phase output.

* * * * *